Oct. 22, 1968   R. B. SALTON   3,406,720

VARIABLE PRESSURE RETAINER DEVICE FOR BRAKE CYLINDERS

Filed Sept. 16, 1965   2 Sheets-Sheet 1

*INVENTOR.*
ROBERT B. SALTON
BY
ATTORNEY

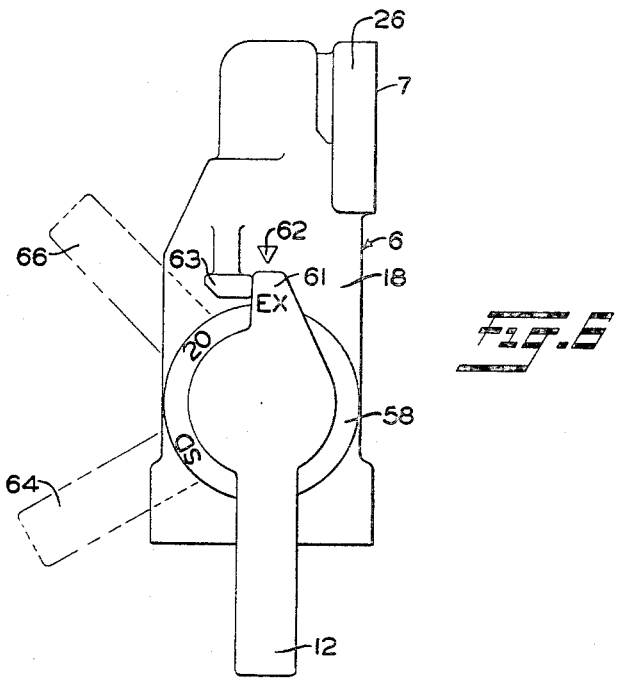
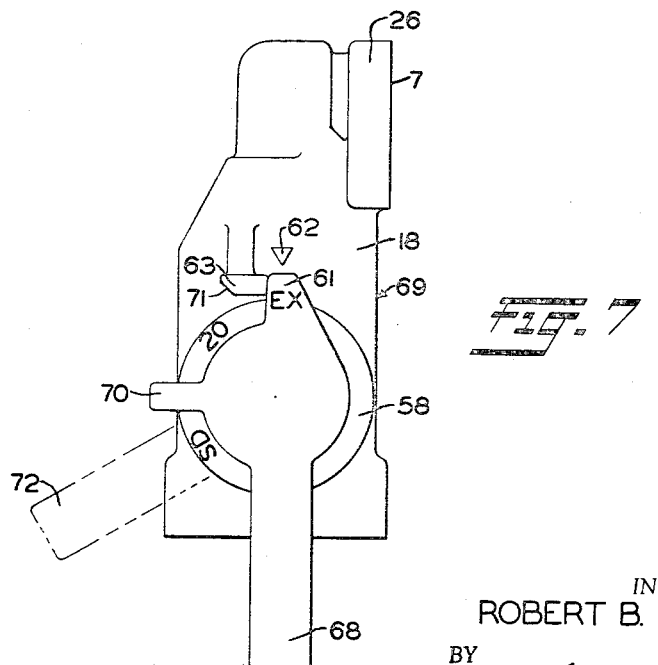

United States Patent Office 3,406,720
Patented Oct. 22, 1968

3,406,720
VARIABLE PRESSURE RETAINER DEVICE FOR BRAKE CYLINDERS
Robert B. Salton, Monroeville, Pa., assignor to Westinghouse Air Brake Company, Wilmerding, Pa., a corporation of Pennsylvania
Filed Sept. 16, 1965, Ser. No. 487,746
3 Claims. (Cl. 137—599.2)

ABSTRACT OF THE DISCLOSURE

A brake cylinder pressure retaining valve device, for connection to the exhaust passageway of a railway car brake control valve device, having a body provided with a bore in which a cylindrical valve element is reciprocable selectively to a plurality of different positions by manually rotatable cam means. The valve element has an internal chamber containing a check valve spring-biased to seated position, which in one position of the valve element cooperates with a projection on the body to be held in open position. The valve element and check valve are effective on operation of the element to its different positions to selectively provide either a fast or a slow blowdown of brake cylinder pressure to atmosphere, or a slow blow-down of brake cylinder pressure to a chosen pressure above atmospheric pressure.

---

In order to insure safe control of railway trains while descending long grades that require one or more successive brake applications, manually adjustable retaining valve devices have long been employed on the cars to limit the release of fluid under pressure from the brake cylinder devices on the cars for thereby maintaining the car brakes applied with limited braking force while the train brake pipe and associated reservoirs of the brake system are being recharged in preparation for a subsequent brake application.

Pressure retaining valve devices heretofore used on railway cars for retaining brake cylinder pressure have comprised a body, usually of cast construction and secured to one end of the car near the top or roof. This body contained therein a manually operable rotary plug type of valve selectively rotatable to a plurality of positions for controlling the flow of fluid under pressure from the brake cylinder device directly to atmosphere or via a corresponding one of a plurality of check valves each normally spring biased against its corresponding seat formed at one end of a corresponding bushing that is press-fitted into one of a plurality of bores in the body of the retaining valve device. Consequently, such construction required removal from the car of the entire pressure retaining valve device and transportation to a railway repair shop whenever repairs were necessary.

In the copending application Ser. No. 480,666 of Charles L. Weber, Jr., filed Aug. 18, 1965, and assigned to the assignee of the present application, there is shown and described for railway rolling stock a novel and easily installed brake cylinder pressure retaining valve device which may be so conveniently located that it could be manually set in either a direct release or a pressure-retaining position by a trainman standing on either side of a railway car, and so constructed that a relatively unskilled trainman could effect repairs thereto without removal from the car simply by replacing a cartridge-type valve unit insertable and removable from an outer casing or valve body.

It is the general purpose of this invention to provide an improved, novel and relatively inexpensive brake cylinder pressure retaining valve device which embodies structural features including a removable cartridge-type valve element together with a different and simpler mode of operation of parts with respect to that in the aforementioned copending Weber application.

According to the present invention, a novel retaining valve device is provided comprising essentially a valve body having a bore within which a removable cylindrical valve element is reciprocated by a manually operated cam, the cylindrical valve element having an internal bore containing therein a spring biased check valve. The cooperation of the cylindrical valve element and check valve with the body of the valve device selectively provides a fast blow-down of brake cylinder pressure to atmospheric pressure, a slow blow-down of brake cylinder pressure to atmospheric pressure, and a slow blow-down of brake cylinder pressure to a chosen pressure above atmospheric pressure.

In the accompanying drawings:

FIG. 1 is a diagrammatic view, in outline, showing a fluid pressure brake equipment for a railway car and including a novel three-position brake cylinder pressure retaining valve device constructed in accordance with a first embodiment of the invention mounted on a fitting that is secured to the car body, the fitting being connected by a pipe to the exhaust port of a brake control valve device, such as the well-known AB valve device.

FIG. 2 is an enlarged view, partly in section, of the three position brake cylinder pressure retaining valve device shown in FIG. 1 showing certain structural details of this valve device.

FIG. 3 is a vertical cross-sectional view, taken along the line 3—3 of FIG. 2 and looking in the direction of the arrows, showing further structural details of the three-position brake cylinder pressure retaining valve device not made apparent in FIG. 2, the brake cylinder pressure retaining valve occupying its first position in which an unrestricted and direct communication is established between a brake cylinder device and atmosphere.

FIG. 4 is a partial vertical cross-sectional view of the three-position brake cylinder pressure retaining valve device of FIG. 3 shown in a second or brake cylinder pressure retaining position in which a chosen pressure is retained in a brake cylinder device subsequent to the flow of fluid under pressure therefrom at a restricted rate until the pressure therein is reduced to a chosen pressure above atmosphere pressure.

FIG. 5 is a partial vertical cross-sectional view of the three-position brake cylinder pressure retaining valve device of FIG. 3 shown in the third of its three positions in which a restricted communication is established between a brake cylinder device and atmosphere whereby fluid under pressure may flow from the brake cylinder device at a slow rate until the pressure therein is completely depleted.

FIG. 6 is an elevational view of the valve device shown in FIG. 2, as viewed from the right-hand side, showing an operating handle and an escutcheon plate rotatable therewith, and their respective relation to a stop and an arrow formed integral with the body of the brake cylinder pressure retaining valve device.

FIG. 7 is an elevational view of a second embodiment of the invention embodying a two-position brake cylinder pressure retaining valve device which is identical to the pressure retaining valve device constituting the first embodiment of the invention except for the provision of a special operating handle having a lug integral therewith for limiting movement of the handle between two positions.

*Description—FIGS. 1 to 4*

Figure 1:
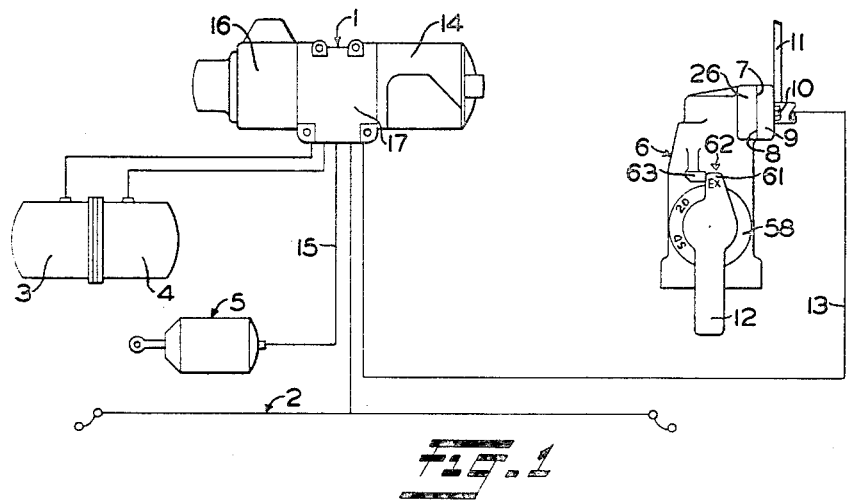

In FIG. 1 of the drawings, there is shown a railway car fluid pressure brake system embodying a novel brake cylinder pressure retaining valve device constructed in accordance with one embodiment of the invention. The railway car fluid pressure brake system comprises a brake controlling valve device 1 to which is connected the usual brake pipe 2, auxiliary reservoir 3, emergency reservoir 4, a brake cylinder device 5, and a novel brake cylinder pressure retaining valve device 6 that has a flanged fitting face 7 that abuts a corresponding face 8 formed on a fitting 9 to which the brake cylinder pressure retaining valve device 6 is secured by a pair of cap screws 10, only one of which appears in FIG. 1. That one of the pair of cap screws that is not shown in FIG. 1 also serves to secure the fitting 9 to a portion 11 of a railway car body in a location in which a handle 12 of the brake cylinder pressure retaining valve device 6 is easily accessible to a trainman. The fitting 9 has connected thereto one end of a brake cylinder exhaust pipe 13 that has its opposite end connected to the exhaust port of the brake controlling valve device 1.

The brake controlling valve device 1 shown in FIG. 1 of the drawings is of the "AB" type which may be of substantially the same construction and have the same operating characteristics as the brake controlling valve device fully described in Patent No. 2,031,213 issued Feb. 18, 1936 to Clyde C. Farmer and assigned to the assignee of the present invention, in view of which it is deemed unnecessary to show and describe this valve device in detail.

Briefly, however, the brake controlling valve device 1 comprises a service portion 14 adapted to operate upon both a service and an emergency rate of reduction in pressure of fluid in brake pipe 2 for supplying fluid under pressure from the auxiliary reservoir 3 to a brake cylinder pipe 15 and thence to the brake cylinder device 5 for, upon a service rate of reduction in brake pipe pressure, effecting a service application of the brakes on the railway car. The brake controlling valve device 1 also comprises an emergency 16 which is adapted to operate only upon an emergency rate of reduction in pressure of fluid in brake pipe 2 for supplying fluid under pressure from the emergency reservoir 4 to pipe 15 and thence to the brake cylinder device 5, wherein such fluid under pressure, in addition to that provided from the auxiliary reservoir 3 by operation of the service portion 14, is adapted to operate the brake cylinder device 5 for effecting an emergency application of the brakes on the railway car. Upon recharging of the brake pipe 2, the brake controlling valve device 1 is adapted to operate to open pipe 15 to atmosphere for releasing fluid under pressure therefrom and from the brake cylinder device 5 for releasing the brakes on the vehicle, and, at the same time, to effect recharging of the auxiliary reservoir 3 and the emergency reservoir 4 in the usual well-known manner. The service and emergency portions 14 and 16, respectively, of the brake controlling valve device 1 are mounted on opposite faces of a pipe bracket 17 to which all pipe connections to the valve device 1 are made, as shown in FIG. 1 of the drawings.

Figure 2:
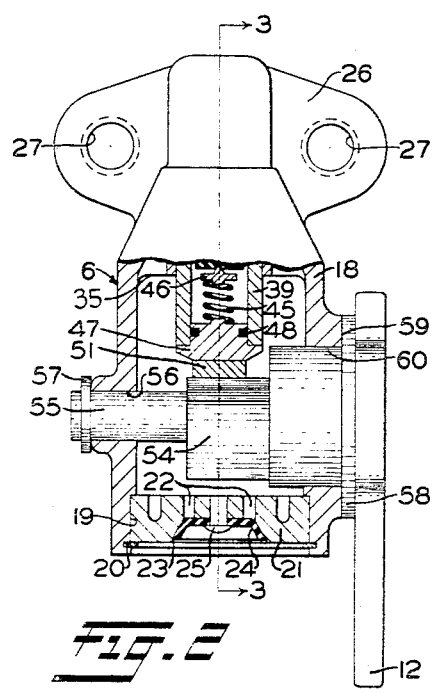
Figure 3:
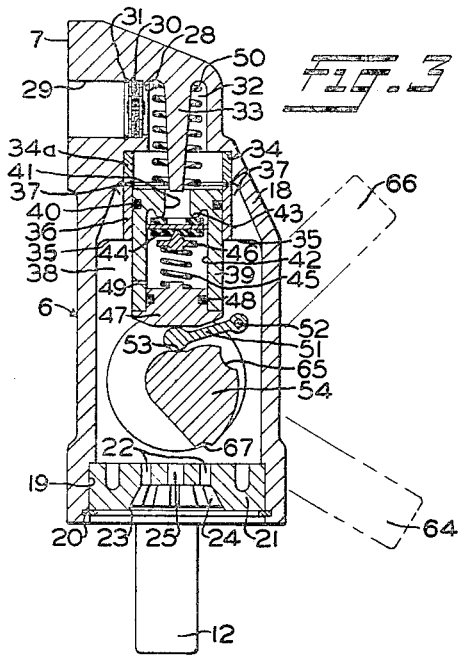

The brake cylinder pressure retaining valve device 6, as shown in FIGS. 2 and 3, comprises a generally cylindrical hollow casing 18 having a counterbore 19 extending upward from its lower end in the wall surface of which counterbore is formed a groove in which is inserted a snap ring 20. This snap ring 20 retains in the counterbore 19 a cylindrical member 21 that has formed in its lower face a frusto-conical cavity into which opens a plurality of arcuately arranged and spaced-apart bores 22, the axes of which are parallel to the axis of the cylindrical member 21. Resting against a conical inner surface 23 of the frusto-conical cavity in the cylindrical member 21 is a dished circular shield 24 which is preferably formed of a resilient material such as rubber. This shield 24 is held in place by suitable means such as, for example, a centrally disposed rivet 25 that extends through coaxial bores in the shield 24 and the cylindrical member 21, the axis of these bores being parallel to the axes of the bores 22. The circumferential surface of the shield 24 is adapted to engage the conical surface 23 for preventing access to the interior of the hollow casing 18 of particles of foreign matter or by nest building insects such as, for example, mud wasps. A plurality of notches or crevatures are formed in the outer surface of the shield 24 for preventing sealing contact thereof with the inner surface 23. It will be noted that the surface 23 on the cylindrical member 21 extends somewhat beyond the rubber shield 24 so as to provide an adequate protection against the formation of ice over the opening in the frusto-conical cavity in the cylindrical member 21, and that the shield 24 has sufficient area and flexibility to insure its displacement under the pressure of fluid released from the brake cylinder device 5 in a manner hereinafter described to eject any foreign matter that might reach it.

As is apparent from FIGS. 2 and 3 of the drawings, the flange fitting face 7 is formed on one side of a flange 26 which is integral with the casing 18 and is provided with two spaced apart screw-threaded bores 27 for receiving in screw-threaded engagement therewith the two above-mentioned cap screws 10 whereby these cap screws serve to secure the flange 26 to the fitting 9 it being understood that a resilient annular gasket (not shown) is interposed between the flange fitting face 7 on the one side of the flange 26 and the corresponding face 8 formed on the adjacent side of the fitting 9.

The above-mentioned one end of the brake cylinder exhaust pipe 13 is disposed in a bore (not shown) in the fitting 9 which bore is coaxial with a bore 28 and a coaxial counterbore 29 formed in the casing 18 the axis of this bore and counterbore intersecting and forming with the axis of the hereinbefore mentioned counterbore 19 in the casing 18 an angle of 90°. Disposed in the counterbore 29 is a strainer device 30 which is retained against the right-hand end of the counterbore 29 by a snap ring 31 that is inserted in a groove formed in the wall surface of the counterbore 29.

The bore 28 opens into a chamber 32 formed in the casing 18 which has integral therewith a tapered stem 33 that extends through the chamber 32 and into a counterbore 34 formed in the casing 18 and coaxial with the hereinbefore-mentioned counterbore 19 in this casing. Press-fitted into the counterbore 34 is a wear bushing 34a.

Formed integral with the casing 18 are a plurality of inwardly extending arcuately spaced-apart ribs 35. The inner ends of these ribs are arcuate in shape whereby the ribs 35 serve to anchor a bushing 36 the upper end of which is disposed below and out of contact with the casing 18 as shown in FIG. 3 so as to form between the adjacent ends of the bushings 34a and 36, between the casing 18 and the bushing 36, and between the plurality of ribs 35 a plurality of passageways 37 through which fluid under pressure may flow from the interior of the bushing 34a to a chamber 38 within the casing 18 above the cylindrical member 21 which chamber 38 is opened to atmosphere past the shield 24 whenever the pressure in this chamber 38 exceeds atmospheric pressure.

The inside diameter of the bushing 36 is the same as the inside diameter of the bushing 34a whereby a cylindrical piston member 39 is slidably mounted in the bushings 36 and 34a. As shown in FIG. 3, the piston member 39 is provided adjacent its upper end with a peripheral annular groove in which is disposed an O-ring 40 that is adapted to form a seal with either the wall of the bushing 36 or the wall of the bushing 34a according to the position of the piston member 39 with respect to the casing 18.

Extending downward from the top of the piston member 39, as shown in FIG. 3, is a central bore 41 that opens into a coaxial counterbore 42 that extends upward from the bottom of the piston member 39. Formed at the lower end of the bore 41 is an annular valve seat 43 against which, while the piston member 39 occupies the position shown in FIG. 3, a flat disc-type check valve 44 is biased or loaded by a spring 45 that is interposed between a spring seat 46, disposed between the upper end of the spring 45 and the valve 44, and a flanged cap member 47 that closes the lower end of the counterbore 42 in piston member 39. The flanged cap member 47 is provided with a peripheral annular groove in which is disposed an O-ring 48 which forms a seal with the wall surface of the counterbore 42 whereby fluid under pressure that flows past the valve 44 when unseated to the interior of the counterbore 42 can flow to the chamber 38 via a restricted passageway or choke 49 formed in the piston member 39 and extending from the wall surface of the counterbore 42 to the peripheral surface of the piston member 39.

Disposed in surrounding relation to the stem 33 and interposed between the casing 18 and the top of the piston member 39 is a spring 50 which is effective to bias the cap member 47 with line contact against an upper cylindrical surface formed at one end of a cam dog 51 that at its opposite end is pivotally mounted on a pin 52, the opposite ends of which are anchored in the casing 18.

As shown in FIG. 3, the above-mentioned one end of the cam dog 51 is interposed between the cap member 47 and a first cam surface 53 formed on a cam element 54 that is located intermediate the ends of a stepped shaft 55 as shown in FIG. 2.

As shown in FIG. 2 of the drawings, the smaller end of the stepped shaft 55 is journaled in and extends through a first bore 56 in the casing 18. That portion of the shaft 55 extending beyond the left-hand end of the bore 56 is provided with a peripheral annular groove in which a snap ring 57 is inserted whereby the shaft 55 is retained against longitudinal movement. A collar or escutcheon plate 58 is formed adjacent the right hand end of the shaft 55, the left-hand side of the collar 58 abutting a flat circular surface 59 formed on the right-hand side of the casing 18 as viewed in FIG. 2. The larger portion of the shaft 55 adjacent the left-hand side of the collar 58 is journaled in a second bore 60 in the casing 18 which bore 60 is coaxial with the first bore 56 in this casing.

As shown in FIG. 2, the right-hand end of the shaft 55 has secured thereto by any suitable means (not shown) the handle 12 whereby the shaft 55 and cam element 54 can be manually rotated by a trainman to any one of three positions indicated in FIG. 3.

As shown in FIG. 6 of the drawings, cast or stenciled on a lug 61 integral with handle 12 is the indicium EX, and cast or stenciled on one side of the collar or escutcheon plate 58 are the indicia SD denoting slow discharge and 20 which are arranged in arcuate spaced-apart relationship. Also, as shown in FIG. 6, formed integral with the casing 18 is a pointer 62 and a stop 63 so disposed that, while the handle 12 occupies the position in which it is shown in FIG. 6, the pointer 62 is in alignment with the indicium EX on the lug 61, the left-hand side of which abuts the stop 63.

*Operation—FIGS. 1 to 6*

As shown in FIG. 1 of the drawings, it will be seen that the brake cylinder retaining valve device 6 is adapted to be associated with a fluid pressure brake equipment comprising the brake controlling valve device 1, the brake pipe 2, the auxiliary reservoir 3, the emergency reservoir 4 and the brake cylinder device 5, it being understood that the brake controlling valve device 1 is operative in the usual manner in effecting a release of the brakes to vent fluid under pressure from the brake cylinder device 5 by way of the brake cylinder exhaust pipe 13 and the brake cylinder pressure retaining valve device 6.

Fluid under pressure thus vented from the brake cylinder device 5 flows via the brake cylinder pipe 15, the brake controlling valve device 1 which, it may be assumed is in its release position, brake cylinder exhaust pipe 13, the bore (not shown) in fitting 9, counterbore 29 (FIG. 3), strainer device 30 and bore 28 to the chamber 32.

Assuming that the handle 12 of the brake cylinder pressure retaining valve device 6 is disposed in its first or non-pressure retaining position shown in FIGS. 1 to 3, inclusive, it will be understood that the cam element 54 occupies the position, shown in FIGS. 2 and 3, in which the left-hand end of the cam dog 51 rests on the first cam surface 53 of the cam element 54. In this position of the cam element 54 and cam dog 51, the spring 50 is effective to bias the piston member 39 downwardly to the position shown in FIG. 3 in which the cap member 47, carried in the lower end of the piston member 39, is supported by the cam dog 51. In this position of the piston member 39, the O-ring 40 carried thereby is disposed below the opening of passageways 37 at the lower end of the bushing 34a. Therefore, the flow of fluid under pressure from the brake cylinder device 5 is unrestricted from the chamber 32 to atmosphere via bushing 34a, passageways 37, chamber 38 and thence past the rubber shield 24 which is deflected away from the conical surface 23 whenever the pressure in the chamber 38 exceeds atmospheric pressure. It will be apparent that, when fluid under pressure thus discharged from the brake cylinder device 5 and chamber 32 is reduced to substantially atmospheric pressure, the shield 24 will return to the position shown in FIGS. 2 and 3 in which its outer peripheral portion lies in contact with the conical inner surface 23 on the cylindrical member 21.

From the foregoing it is apparent that, when a brake release is effected while the handle 12 occupies the non-pressure retaining position shown in FIGS. 1 to 3 inclusive, no fluid under pressure is retained in the brake cylinder device 5.

If it is desired to release fluid under pressure from the brake cylinder device 5 at a chosen slow rate until the pressure therein is reduced to a chosen pressure such as, for example, twenty pounds per square inch, and thereafter retain this pressure in the brake cylinder device 5 when a brake release and recharge of the brake equipment is effected while a train is descending a long grade, prior to beginning the descent the train will be stopped and a trainman, assuming each car in the train to be provided with the brake cylinder pressure retaining valve device 6 shown in FIGS. 1 to 6 inclusive, will manually rotate the handle 12 of each valve device 6 clockwise from its first position shown in FIG. 6 to a second position in which the indicium 20 on the escutcheon plate 58, which is rotatable with the handle 12, is in alignment with the pointer 62 on the casing 18, this second position of the handle 12 being shown in broken lines in FIGS. 3 and 6 and denoted by the numeral 64.

As the handle 12 is rotated as described above, it is effective to rotate therewith the shaft 55 and cam element 54, counterclockwise, as viewed in FIG. 3, so that this cam element 54 is rotated to a second position in which the left-hand end of the cam dog 51 is interposed between the cap member 47 and a second cam surface 65 formed on the cam element 54. As is apparent from FIG. 3, the second cam surface 65 is further from the axis of rotation of the cam element 54 and shaft 55 than is the first cam surface 53. Therefore, as the cam element 54 and shaft 55 are rotated counterclockwise from the position shown in FIG. 3 in which the left-hand end of the cam dog 51 abuts the first cam surface 53 to a second position in which the left-hand end of this cam dog 51 abuts the second cam surface 65 on the cam element 54, the cam dog 51 is rocked clockwise about the pin 52. This clockwise rocking of the cam dog 51 about the pin 52 is effective to move the cap member 47 and piston member 39 upwardly from the position shown in FIG. 3 to the position, shown in FIG. 4, in which the O-ring 40 carried by the piston member 39 makes a seal with the wall surface of the bushing 34a above the location at which the passageways 37 open at the lower end of this bushing 34a. It should be noted that the piston member 39 is not upwardly far enough for the stem 33 to unseat the check valve 44 from the annular valve seat 43 against the yielding resistance of the spring 45.

Figure 4:
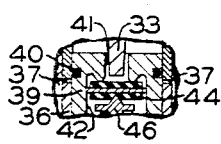
Figure 5:
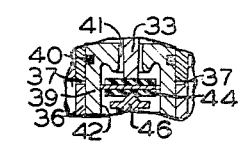

Now when the pressure in the brake pipe 2 is restored to its normal charged value and the brake controlling valve device 1 is moved to its release position in response to this increase in pressure in the brake pipe 2, fluid under pressure will flow from the brake cylinder device 5 to the chamber 32 (FIG. 3) in the manner hereinbefore described in detail. Since the O-ring 40 carried by the piston member 39 now makes a seal with the wall surface of the bushing 34a at a location above the opening of the passageways 37 at the lower end of this bushing, as shown in FIG. 4, the fluid under pressure supplied to the chamber 32 flows to the upper side of the valve 44 via the interior of the bushing 34a and bore 41 and acts on the area of this valve within the annular valve seat 43. When the pressure acting on the area of the valve 44 within the annular valve seat 43 formed on the piston member 39 has been increased to a chosen pressure such as, for example, twenty pounds per square inch, valve 44 will be moved downwardly away from the annular valve seat 43 against the yielding resistance of the spring 45.

Subsequent to the unseating of the valve 44 in the manner just explained, fluid under pressure supplied from the brake cylinder device 5 to the interior of the bushing 34a and bore 41 will flow past the unseated valve 44 and thence to atmosphere via the central bore 42 and restricted passageway or choke 49 in the piston member 39, chamber 38 and past the rubber shield 24 at a slow or restricted rate determined by the size of the choke 49 until the pressure in the brake cylinder device 5 is reduced to the aforementioned twenty pounds per square inch at which time the spring 45 will move the valve 44 into seating contact with the annular valve seat 43 to prevent a further reduction in pressure in the brake cylinder device 5. Thus a pressure of, for example, twenty pounds per square inch, is retained in each brake cylinder device 5 to maintain the brakes applied while the brake equipment is released and recharged preparatory to effecting a second or successive brake application as a train descends a long grade in mountainous terrain.

If it is desired to provide a complete release of fluid under pressure from the brake cylinder devices 5 on the cars in a train, but at a slow or restricted rate, when a brake release and recharge of the brake equipment is effected while a train is descending a long grade, prior to beginning the descent, the train will be stopped and a trainman will manually rotate the handle 12 and escutcheon plate 58 clockwise, as viewed in FIG. 6, from the position they occupy to the position in which the indicium SD on the escutcheon plate 58 is in alignment with the pointer 62 on the casing 18, this third position of the handle 12 being shown in broken lines in FIGS. 3 and 6 and indicated by the reference numeral 66.

As the handle 12 is rotated as described above, the shaft 55 and cam element 54 are rotated therewith so that the cam element 54 is rotated counterclockwise, as viewed in FIG. 3, to a position in which the left-hand end of the cam dog 51 is interposed between the cap member 47 and a third cam surface 67 formed on the cam element 54. As is apparent from FIG. 3, this third cam surface 67 is farther from the axis of rotation of the cam element 54 and shaft 55 than are the cam surfaces 53 and 65. Therefore, as the cam element 54 and shaft 55 are rotated to the position in which the left-hand end of cam dog 51 abuts the third cam surface 67 on the cam element 54, the cam dog 51 is rocked correspondingly clockwise about the pin 52. It is apparent from FIG. 3 that this clockwise rocking of the cam dog 51 about the pin 52 is effective to move the cap member 47 and piston member 39 upwardly to the position shown in FIG. 5 in which the lower end of the stem 33 engages and unseats the valve 44 from the annular valve seat 43, it being understood that in this position of the piston member 39 the O-ring 40 carried thereby makes a seal with the wall surface of the bushing 34a at a location above the opening of the passageways 37 at the lower end of this bushing.

If now the pressure in the brake pipe 2 is increased to its normal charged value, the brake controlling valve device 1 on each car in the train will move to its brake release position. When each brake controlling valve device 1 returns to its brake release position, fluid under pressure will flow from the corresponding brake cylinder device 5 to atmosphere via pipe 15, brake controlling valve device 1, pipe 13, fitting 9, counterbore 29 (FIG. 3), strainer device 30, bore 28, chamber 32, bushing 34a, central bore 41 in piston member 39, past now unseated check valve 44, counterbore 42, restricted passageway or choke 49, chamber 38, and past the rubber shield 24. Fluid under pressure will thus flow from the brake cylinder device 5 on each car in the train to atmosphere at a slow or restricted rate determined by the size of the choke 49, until fluid under pressure has been completely depleted from the respective brake cylinder device or in other words until the pressure in each brake cylinder device has been reduced to atmospheric pressure.

*Description—FIG. 7*

FIG. 7 shows a two-position brake cylinder pressure retaining valve device that constitutes a second embodiment of the invention. The brake cylinder pressure retaining valve device shown in FIG. 7 is identical in construction to the brake cylinder pressure retaining valve device shown in FIGS. 1 to 6 inclusive, except the handle 12 of the first embodiment of the invention is replaced by a handle 68 shown in FIG. 7. Accordingly, like reference numerals have been used to designate the structure shown in FIG. 7 which is identical with that shown in FIGS. 1 to 6 inclusive, and already described. Only such features of the structure and operation of the embodiment of FIG. 7 which differ from that of the embodiment of FIGS. 1 to 6 inclusive will be hereinafter described.

According to the second embodiment of the invention shown in FIG. 7, this two-position brake cylinder pressure retaining valve device 69 is identical in construction to the three-position brake cylinder pressure retaining valve device 6 except the handle 12 of the brake cylinder pressure retaining valve device 6 is replaced by the handle 68.

The handle 68 shown in FIG. 7 of the drawings, like the handle 12 shown in FIG. 6, is provided with the lug 61 on which is cast or stenciled the indicium EX. The handle 68, however, is provided with a second lug 70 which, as shown in FIG. 7 is arcuately spaced substantially 90° from the lug 61. This second lug 70 on the handle 68 is so disposed as to be moved into contact with a flat inclined surface 71 formed on the stop 63 when the handle 68 is manually rotated from the position shown in FIG. 7 in a clockwise direction through an angle of substantially 45° to a second position with is shown in broken lines in FIG. 7 and indicated by the numeral 72. It should be noted that this second position of the handle 68, which is indicated by the reference numeral 72 in FIG. 7, corresponds to the second position of the handle 12 shown in FIG. 6 and indicated in FIG. 6 by the reference numeral 64. Accordingly, it will be understood that when the handle 68 of the brake cylinder pressure retaining valve device 69 is moved to its second position, indicated by the reference numeral 72 in FIG. 7, this brake cylinder pressure retaining valve device 69, if substituted for the brake cylinder pressure retaining valve device 6, shown in FIG. 1 of the drawings, will function, in the manner hereinbefore described in detail in connection with the brake cylinder pressure retaining valve device 6, when a brake release is effected in the manner hereinbefore described, to release fluid under pressure from the brake cylinder device 5 at a slow or restricted rate until the pressure in the brake cylinder device 5 is reduced to the aforementioned twenty pounds per square inch.

Since the lug 70 now abuts the flat inclined surface 71 on the stop 63, the handle 68 cannot be manually rotated clockwise beyond its second position. Consequently, the brake cylinder pressure retaining valve device 69 cannot be conditioned to provide for a complete release of fluid under pressure from the brake cylinder device 5 at a slow or restricted rate and therefore, is only a two-position brake cylinder pressure retaining valve device. In other words, the three-position brake cylinder pressure retaining valve device 6 can be converted into the two-position brake cylinder pressure retaining valve device 69 by substituting the handle 68 having the two lugs 61 and 70 for the handle 12 having the single lug 61.

Having now described the invention, what I claim as new and desire to secure by Letters Patent, is:

1. A pressure retaining valve device comprising:
   (a) a casing provided with a bore having at one end an inlet port and having at the other end an outlet port,
   (b) two coaxially related and axially spaced sleeves mounted in the bore in said casing and cooperating with the casing to form between the adjacent ends thereof a communication between said inlet and outlet ports,
   (c) a cylindrical valve member slidably mounted in sealed relation in one of said sleeves and having therein an internal chamber at one end of which is a port providing a communication between said internal chamber and said inlet port, the inner end of said port having formed thereabout an annular valve seat,
   (d) a loaded check valve normally biased into seated relation with said annular valve seat,
   (e) choke means carried by said valve member providing a restricted communication between said internal chamber and said outlet port,
   (f) cam means rotatably mounted in said casing and so disposed between said valve element and said outlet port as to support thereon one end of said valve element, and
   (g) manually operated means disposed exteriorly of said casing and operatively connected to said cam means to cause said cam means to shift said valve element in one direction in said one sleeve to a second position in which said valve element enters said other sleeve thereby closing said communication between said inlet and outlet ports and thereby permitting the flow of fluid under pressure from said inlet port to said outlet port only past said loaded check valve and thence through said choke means at a restricted rate so long as the pressure of fluid at said inlet port is sufficient to unseat said check valve.

2. A pressure retaining valve device, as claimed in claim 1, further characterized by a pin carried by said casing in coaxial relation to said bore for holding said check valve unseated from said valve seat upon shifting of said valve element by said cam means in said one direction from said second position to a third position to thereby permit the flow of fluid under pressure from said inlet port to said outlet port only past said unseated check valve and thence through said choke means at a restricted rate until the pressure at said inlet port is reduced to atmospheric pressure.

3. A pressure retaining valve device comprising:
   (a) a hollow casing provided with a bore and an inlet port opening into said bore, said port being connectable to a device charged with fluid under pressure,
   (b) a unitary valve mechanism installable in and removable from the bore in said hollow casing as a unit, said valve mechanism comprising:
      (i) a cylindrical valve member slidably mounted in said bore and having provided therein a valve seat, and
      (ii) a loaded check valve cooperating with said valve seat from which it is unseated by pressure of fluid supplied to said inlet port exceeding a certain pressure, said valve member having a first position in which it opens a communication in bypass of said check valve via which fluid under pressure supplied to said inlet port may flow to atmosphere, and a second position in which said valve member closes said communication to thereby limit the flow of fluid under pressure from the inlet port in said casing to atmosphere to flow past said check valve,
   (c) a shaft journalled in said hollow casing,
   (d) cam means carried by said shaft and having a plurality of cam surfaces selectively moved into operating relation with said valve member for effecting movement thereof to either of said two positions, and
   (e) lever means secured to said shaft and having two lugs thereon so angularly spaced and cooperating with said casing as to limit rotary movement to said shaft to two extremities of travel, in one of which extremities said valve member occupies said first position and in the other of which extremities said valve member occupies said second position.

References Cited

UNITED STATES PATENTS

| 2,039,220 | 4/1936 | Heggem | 251—286 X |
| 2,204,796 | 6/1940 | Farmer | 303—90 X |
| 2,564,793 | 8/1951 | Seter | 74—55 X |
| 2,630,137 | 3/1953 | Krone et al. | 137—630 |
| 2,965,354 | 12/1960 | Grove et al. | 251—288 X |

FOREIGN PATENTS

| 568,774 | 4/1945 | Great Britain. |
| 746,350 | 3/1933 | France. |

WILLIAM F. O'DEA, *Primary Examiner.*

D. H. LAMBERT, *Assistant Examiner.*